April 15, 1958  R. R. WORDEN  2,830,307
ENTRENCHING TOOL
Filed Aug. 13, 1954
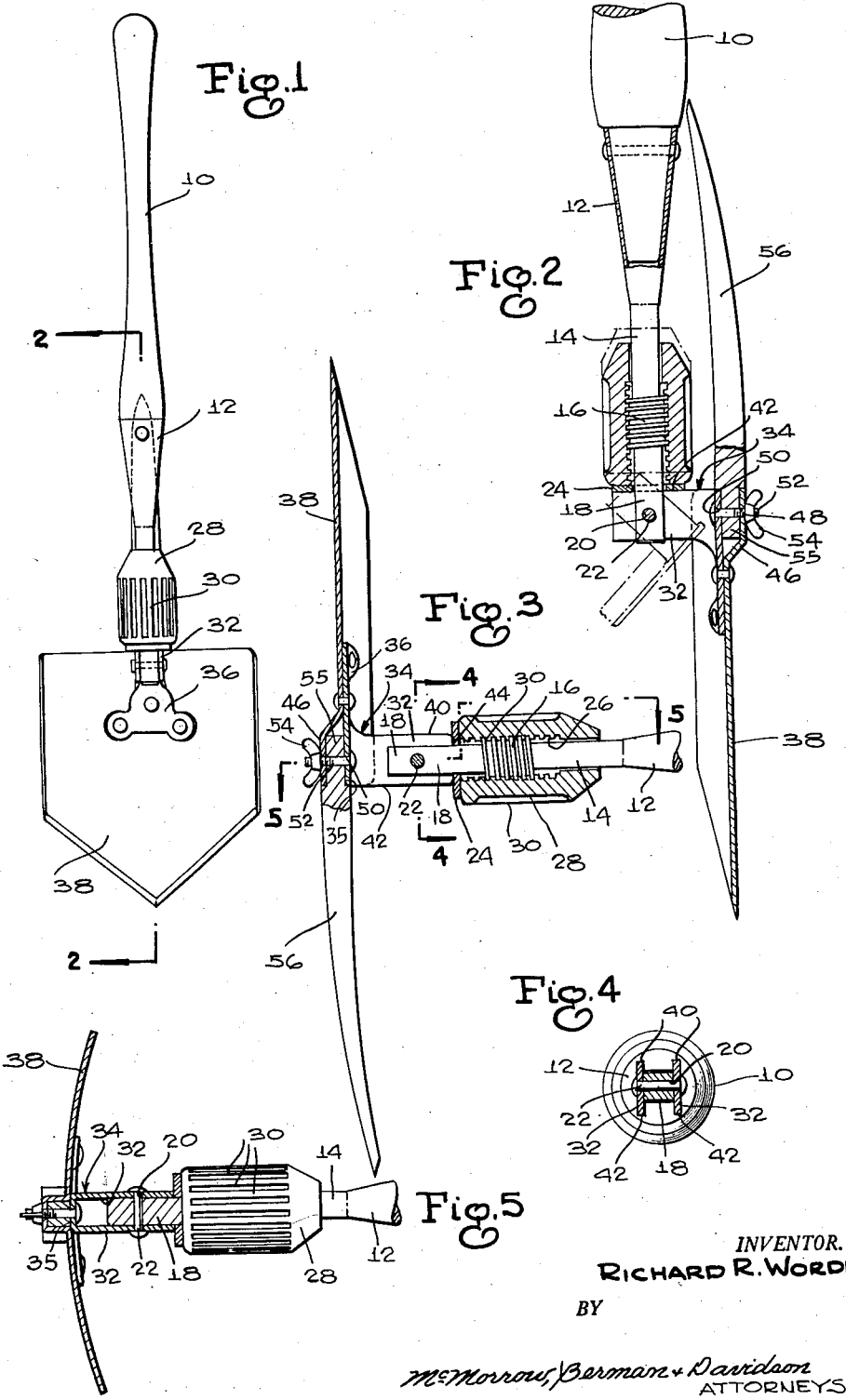
INVENTOR.
RICHARD R. WORDEN
BY
McMorrow, Berman & Davidson
ATTORNEYS

United States Patent Office 2,830,307
Patented Apr. 15, 1958

2,830,307

ENTRENCHING TOOL

Richard R. Worden, Ecorse, Mich.

Application August 13, 1954, Serial No. 449,582

2 Claims. (Cl. 7—14.55)

This invention relates to an improved trenching tool involving a tool head combining a pick blade and a spading or shovel blade, the head being movable into positions for employment of either blade in line with the handle or crosswise of the handle, and wherein one of the blades is removably mounted on the other blade.

The primary object of the invention is to provide a more practical, efficient, and useful tool of this kind which can be made in rugged and serviceable forms at relatively low cost, and which provides for replacement of the removable blade when worn or broken without discarding the entire tool head.

Other important objects and advantageous features of the invention will be apparent from the following description and the accompanying drawings, wherein, for purposes of illustration only, a specific form of the invention is set forth in detail.

In the drawings:

Figure 1 is a rear view of a trenching tool embodying the features of this invention;

Figure 2 is an enlarged longitudinal sectional view taken substantially on the line 2—2 of Figure 1 showing the tool head in a digging position;

Figure 3 is a similar longitudinal sectional view showing the tool head in hoeing position;

Figure 4 is a sectional view taken substantialy on the line 4—4 of Figure 3; and Figure 5 is a fragmentary sectional view taken substantially on the line 5—5 of Figure 3.

Referring to the drawings in detail, the illustrated device comprises a handle 10 provided adjacent one end with a socket 12 terminating in an axial stem 14 of substantially circular having thereon screw threads 16. A shank 18 of rectangular cross section extending axially from the stem 14, and a pivot 22 extends transversely through the shank 18 in an opening 20 near the free outer end of the shank. Mounted for longitudinal movement relative to the rectangular shank 18 and the stem 14 is a nut 30 having internal screw threads 26 engaged with the stem threads 16. The nut has a ribbed surface 30 by means of which the nut may be rotated on the threads 16 to advance or retract it along the stem 14 and the shank 18.

Engaged with opposite sides of the shank 18 are legs 32 of a U-shaped yoke 30 having a bight portion 35 having thereon a lateral extension 36 which projects perpendicularly from the legs 32 and has riveted or otherwise rigidly secured thereto spading or shovel blade 38. It is to be noted that the arms 32 have opposite longitudinal edges 40 and 42 which are flat and straight and that the inner ends 44 of the legs are flat and are at right angles to the legs.

An outwardly offset arm 46 extends from the inner end of the shovel blade 38 as illustrated in Figures 2 and 3, and is provided with an opening 48 which aligns with an opening 50 in the bight portion 35 of the yoke 34 to receive a bolt 52 having a wing nut 53 thereon by means of which a shank 55 on the inner end of a pick blade 56 may be detachably secured between the yoke bight portion 35 and the arm 46.

In use it will be evident that by rotating the nut 28 in one direction, it is retracted along the stem 14 and the shank 18 and away from the pivot 22 to enable the yoke 34 to be swung to a selected position about the pivot as suggested in Figures 2 and 3. A washer 24 sliding on the shank 18 between the nut 28 and the yoke 34, when engaged with the edges 42 of the yoke legs 32, holds the blade 38 in a digging position longitudinally of the handle 10 as illustrated in Figure 2 to define a shovel. The blade 38 is held in this position by advancing the nut 28 along the threads 16 to cause the flat surfaces 42 to be forcibly engaged by the washer 24. When it is desired to position the blade 38 in hoeing position, the nut 28 is backed off so as to enable the yoke 34 to be rotated about the pivot 22 into a position in which the yoke leg ends 44 are presented for engagement by the washer 24 after which the nut is advanced on the shank to clamp the washer 24 against the leg ends 44 and hold the blade 38 perpendicular to the axis of the handle 12. Obviously, when it is desired to fold the blade 38 alongside of the handle for compact transportation or storage, the nut 28 is backed off and the yoke 34 is rotated to present the leg edges 40 to the washer 24, after which the nut is advanced to hold the position. Obviously, the pick blade 56 may be detached from the spade blade 38 by loosening the wing nut 54 and extracting the bolt 50.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a tool head, a U-shaped yoke having a bight portion having an outer side, a lateral extension on said bight portion, said extension having an outer side, and a blade having an inner end portion engaged with said outer sides and fixed thereto, an outwardly offset arm on the inner end of said blade, said arm facing and being spaced from the outer side of said bight portion, and another blade having an inner end having a shank thereon engaged between the outer side of said bight portion and said arm, and separable fastening means acting between said arm and said other blade shank and fastening said other blade in place.

2. In a tool head, a U-shaped yoke having a bight portion having an outer side, a lateral extension on said bight portion, said extension having an outer side, and a blade having an inner end portion engaged with said outer sides and fixed thereto, an outwardly offset arm on the inner end of said blade, said arm facing and being spaced from the outer side of said bight portion, and another blade having an inner end having a shank thereon engaged between the outer side of said bight portion and said arm, and separable fastening means acting between said arm and said other blade shank and fastening said other blade in place, said fastening means comprising a bolt having a shank portion traversing said arm and said other blade shank and releasably engaged with said bight portion, and a nut on said bolt shank bearing against said arm.

References Cited in the file of this patent

UNITED STATES PATENTS

| 365,208 | Storey | June 21, 1887 |
| 1,061,217 | Breeden | May 6, 1913 |
| 2,095,549 | Hoffman | Oct. 12, 1937 |
| 2,687,539 | Crisanti | Aug. 31, 1954 |

FOREIGN PATENTS

| 484,610 | Great Britain | May 9, 1938 |